(12) United States Patent
Boissière et al.

(10) Patent No.: US 11,243,734 B2
(45) Date of Patent: Feb. 8, 2022

(54) PRIVACY SCREEN

(71) Applicant: Apple Inc., Cupertino, CA (US)

(72) Inventors: Clément Pierre Nicolas Boissière, San Francisco, CA (US); Timothy R. Oriol, San Jose, CA (US)

(*) Notice: Subject to any disclaimer, the term of this patent is extended or adjusted under 35 U.S.C. 154(b) by 0 days.

(21) Appl. No.: 16/833,230

(22) Filed: Mar. 27, 2020

(65) Prior Publication Data
US 2020/0225901 A1 Jul. 16, 2020

Related U.S. Application Data

(63) Continuation of application No. PCT/US2018/052868, filed on Sep. 26, 2018.

(60) Provisional application No. 62/566,187, filed on Sep. 29, 2017.

(51) Int. Cl.
| G06F 3/14 | (2006.01) |
| G06K 9/00 | (2006.01) |
| G09G 5/38 | (2006.01) |

(52) U.S. Cl.
CPC ........ G06F 3/1423 (2013.01); G06K 9/00624 (2013.01); G09G 5/38 (2013.01); *G09G 2354/00* (2013.01)

(58) Field of Classification Search
CPC .... G06F 3/1423; G06F 21/6245; G06F 21/84; G06K 9/00624; G09G 5/38; G09G 2354/00; H04L 65/602; H04L 65/604
See application file for complete search history.

(56) References Cited

U.S. PATENT DOCUMENTS

| 10,580,149 | B1* | 3/2020 | Lakshminarayanan ............... H04N 5/23203 |
| 2013/0222227 | A1* | 8/2013 | Johansson ............. H04L 65/403 345/156 |
| 2015/0302621 | A1 | 10/2015 | Liu et al. |
| 2016/0363774 | A1 | 12/2016 | Kawasima |
| 2017/0068500 | A1* | 3/2017 | Rochford ............. G06F 3/1431 |
| 2018/0007414 | A1* | 1/2018 | Li ...................... H04N 21/4532 |

FOREIGN PATENT DOCUMENTS

| EP | 3111272 A1 | 1/2017 |
| JP | 2015-14977 A | 1/2015 |
| JP | 2017-4354 A | 1/2017 |

(Continued)

OTHER PUBLICATIONS

International Preliminary Report on Patentability received for PCT Patent Application No. PCT/US2018/052868, dated Apr. 9, 2020, 10 pages.

(Continued)

*Primary Examiner* — Sahlu Okebato
(74) *Attorney, Agent, or Firm* — Dentons US LLP

(57) ABSTRACT

A first device coupled with a first display and an image sensor receives output data from a second device having a second display different from the first display. The output data represents content displayable by the second device on the second display. The first device determines, using the image sensor, a position of the second display relative to the first device and causes the first display to display content based on the output data received from the second device and the determined position of the second display relative to the first device.

16 Claims, 10 Drawing Sheets

(56) References Cited

FOREIGN PATENT DOCUMENTS

KR  10-2015-0098361 A  8/2015
KR  10-2015-0098362 A  8/2015

OTHER PUBLICATIONS

International Search Report and Written Opinion Received for PCT Application No. PCT/US2018/052868, dated Jan. 18, 2019, 11 pages.
Office Action received for European Patent Application No. 18793079.7, dated Jan. 22, 2021, 6 pages.
Office Action received for Korean Patent Application No. 10-2020-7009322, dated Apr. 23, 2021, 9 pages (4 pages of English Translation and 5 pages of Official Copy).
Office Action received for Japanese Patent Application No. 2020-517967, dated May 24, 2021, 7 pages (4 pages of English Translation and 3 pages of Official Copy).
Office Action received for Japanese Patent Application No. 2020-517967, dated Sep. 13, 2021, 4 pages (2 pages of English Translation and 2 pages of Official Copy).
Notice of Allowance received for Korean Patent Application No. 10-2020-7009322, dated Oct. 8, 2021, 3 pages (1 page of English Translation and 2 pages of Official Copy).
Decision to Grant received for Japanese Patent Application No. 2020-517967, dated Dec. 6, 2021, 2 pages (1 page of English Translation and 1 page of Official Copy).

* cited by examiner

PRIVACY SCREEN

CROSS-REFERENCE TO RELATED APPLICATIONS

This application is a continuation of International Application No. PCT/US2018/052868, titled "Privacy Screen for Computer Simulated Reality," filed Sep. 26, 2018, which claims priority to U.S. Provisional Patent Application No. 62/566,187, titled "Privacy Screen for Virtual and Augmented Reality," filed Sep. 29, 2017, the contents of each of which are incorporated by reference in their entireties.

FIELD

The present disclosure relates to the display of digital content of external devices in computer simulated reality.

BACKGROUND

In some circumstances, a user of an electronic device, such as a computer, phone, or other computing device with a display, will want to prevent other people from seeing content displayed on a screen of the device. For example, a user may wish to use a portable device in a public café or on an airplane to work on private documents. Traditional solutions include a physical screen that is placed in front of the display and that restricts the angles at which light emitted from the display can be seen.

BRIEF SUMMARY

Traditional privacy screens as described above have several undesirable characteristics. For example, traditional privacy screens attenuate some of the light in the direction perpendicular to the display, which reduces the brightness perceived by the user. To compensate, a user may remove the privacy screen when privacy is not a concern, in which case the user has to store, transport, and re-install the privacy screen. Alternatively, a user may increase the brightness output of the display to compensate for the amount of light blocked by the privacy screen, which reduces the battery life of the device. Also, by blocking light in non-perpendicular directions, the privacy screen restricts the angles at which the user can use the device. Yet, a traditional privacy screen still may not block all light emitted at non-perpendicular angles, thereby allowing others that are not directly in front of the device some visibility to the content on the display. Finally, a traditional privacy screen does not prevent displayed content from being observable by other individuals that are also positioned directly in front of the screen (e.g., directly behind the user).

The techniques described below more effectively and efficiently protect the content of an electronic device by restricting non-users from being able to observe the content displayed by the device. As can be seen in the discussion below, such techniques may have the additional advantage of conserving power and increasing the time between battery charges for battery operated devices.

In some embodiments, a method is performed using a system that includes a first device with a first display and a second device with a second display different than the first display. The method includes: producing, by the first device, output data responsive to input; determining if the first device is operating in a first mode or a second mode; if the first device is operating in the first mode, displaying content on the first display in accordance with the output data; if the first device is operating in the second mode, refraining from displaying content on the first display in accordance with the output data, and transmitting the output data to the second device; determining, using an image sensor, a position of the first display relative to the second display; and displaying, on the second display, content in accordance with the output data and the determined position of the first display relative to the second display.

In some embodiments, a system includes, a first device with a first display and a second device with a second display different than the first display. The first device is configured to: produce output data responsive to input; determine if the first device is operating in a first mode or a second mode; if the first device is operating in the first mode, display content on the first display in accordance with the output data; and if the first device is operating in the second mode, refrain from displaying content on the first display in accordance with the output data, and transmit the output data to a second device. The second device is configured to: display, on the second display, content in accordance with the output data and a determined position of the first display relative to the second display, where the position of the first display relative to the second display is determined using an image sensor.

In some embodiments, a computer-readable storage medium comprises one or more programs for execution by one or more processors of a system having a first electronic device with a first display and a second electronic device with a second display. The one or more programs include instructions which, when executed by the one or more processors, cause the system to: produce output data responsive to input; determine if the first device is operating in a first mode or a second mode; if the first device is operating in the first mode, display content on the first display in accordance with the output data; if the first device is operating in the second mode, refrain from displaying content on the first display in accordance with the output data, and transmit the output data to a second device; determine, using an image sensor, a position of the first display relative to the second display; and display, on the second display, content in accordance with the output data and the determined position of the first display relative to the second display.

In some embodiments, a method includes: at a first device coupled with a first display and an image sensor: receiving output data from a second device having a second display different from the first display, where the output data represents content displayable by the second device on the second display; determining, using the image sensor, a position of the second display relative to the first device; and causing the first display to display content based on the output data received from the second device and the determined position of the second display relative to the first device.

In some embodiments, an electronic device includes: one or more processors; and memory storing one or more programs configured to be executed by the one or more processors. The one or more programs include instructions for: receiving output data from a second device having a second display different from a first display coupled with the electronic device, where the output data represents content displayable by the second device on the second display; determining, using an image sensor coupled with the electronic device, a position of the second display relative to the electronic device; and causing the first display to display content based on the output data received from the second device and the determined position of the second display relative to the electronic device.

In some embodiments, a computer-readable storage medium comprises one or more programs for execution by one or more processors of an electronic device coupled with a first display and an image sensor. The one or more programs include instructions which, when executed by the one or more processors, cause the electronic device to: receive output data from a second device having a second display different from the first display, wherein the output data represents content displayable by the second device on the second display; determine, using the image sensor, a position of the second display relative to the electronic device; and cause the first display to display content based on the output data received from the second device and the determined position of the second display relative to the electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with more efficient and effective methods and interfaces for providing a privacy screen on an electronic device, thereby protecting the content being produced and increasing the environments in which the device may be safely operated. Such methods and interfaces may complement or replace other methods for safeguarding content while operating a device.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1A:
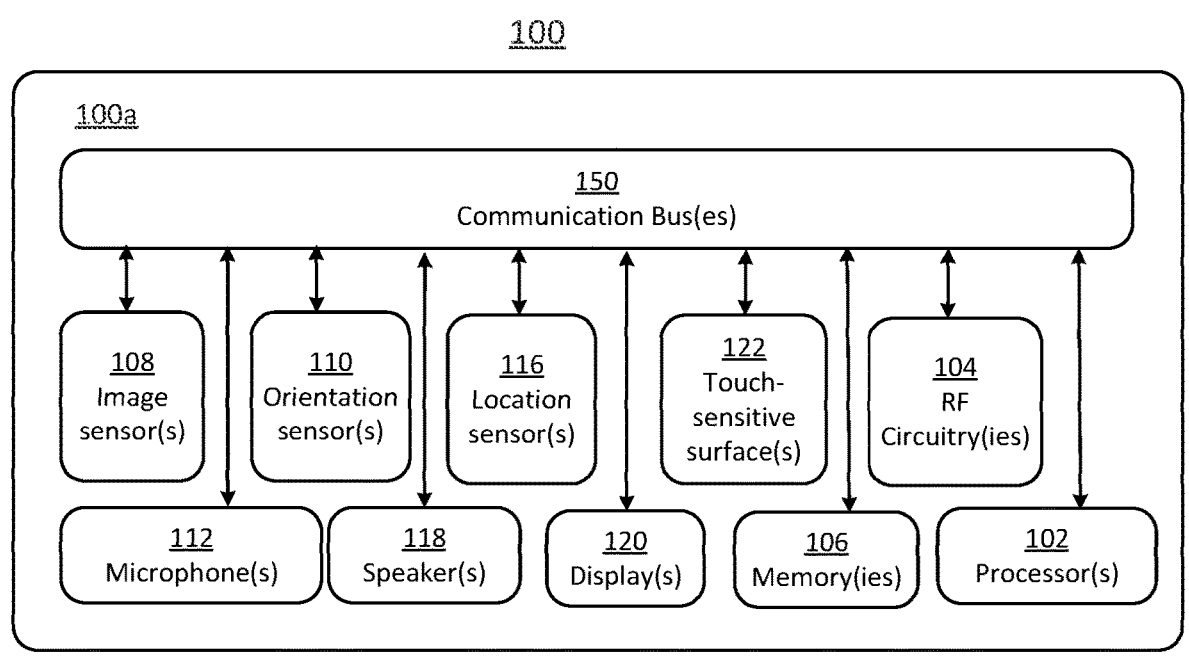
FIGS. 1A and 1B depict an exemplary system for use in various reality technologies, including computer simulated reality.

The following description sets forth exemplary methods, parameters, and the like. However, such description is not intended as a limitation on the scope of the present disclosure but is instead provided as a description of exemplary embodiments.

In the following description, a physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 1B:
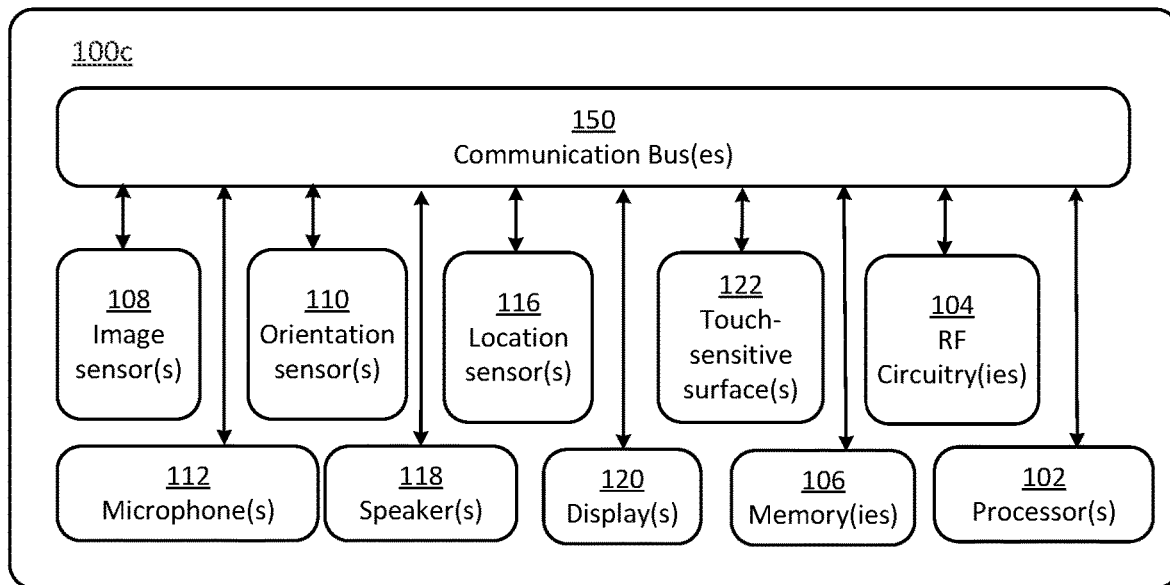
Figure 1B:
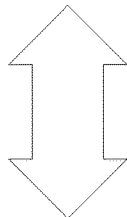
Figure 1B:
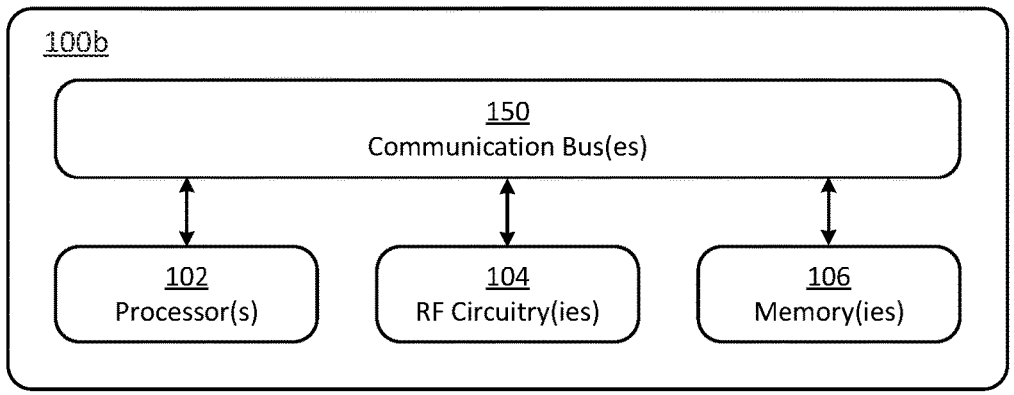

FIGS. 1A and 1B depict exemplary system 100 for use in various reality technologies, including computer simulated reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a second device (e.g., a head-mounted device). In some examples, device 100a is implemented in a base station device or a second device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some embodiments, system 100 is a projection-based system that uses retinal projection to project images onto an individual's retina or projects virtual objects into a physical setting (e.g., onto a physical surface or as a holograph).

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical elements from a physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical setting around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor(s) 108 to track the position and orientation of display(s) 120 relative to one or more fixed elements in the physical setting.

In some embodiments, system 100 includes microphones(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Turning now to FIGS. 2A-2B, 3A-3D, and 4, exemplary electronic devices and user interfaces for providing a privacy screen on an electronic device (e.g., 100a), in accordance with some embodiments, are described. The figures are used to illustrate the processes described below, including the processes in FIGS. 5 and 6.

Figure 2A:
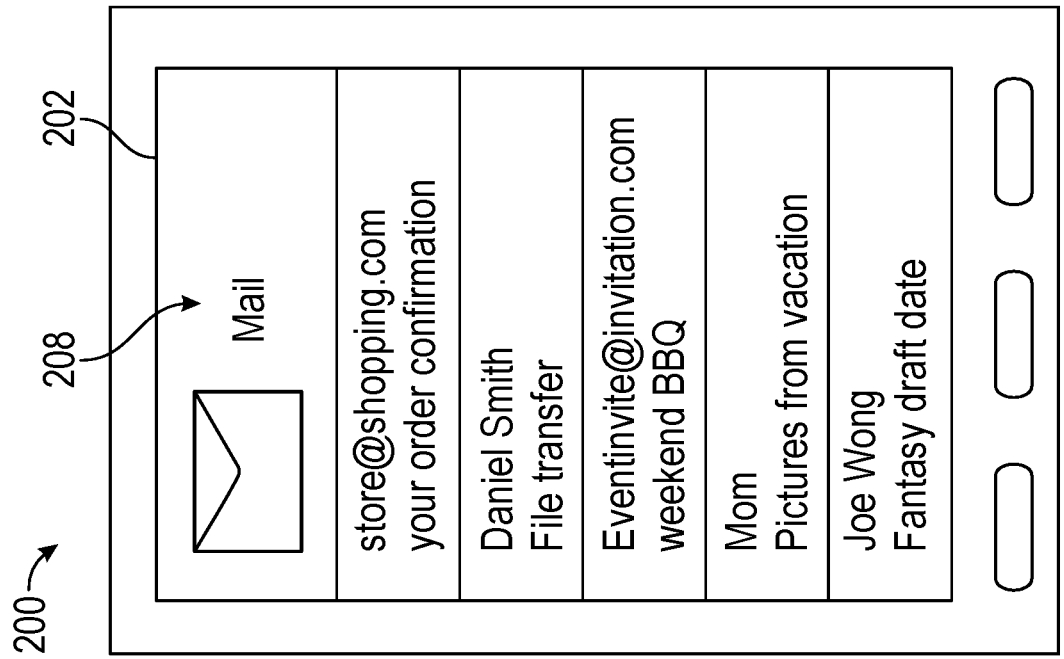
FIGS. 2A and 2B illustrate an exemplary electronic device and user interfaces in accordance with some embodiments.

FIG. 2A illustrates an electronic device 200 with a display 202 that presents content (e.g., a graphical user interface (GUI) associated with the state of device 200). In FIG. 2A, the content displayed by device 200 includes GUI screen 204 with selectable icons for launching respective applications. In some embodiments, device 200 is a smartphone, tablet computer, laptop computer, desktop computer, smartwatch, or other electronic device that has a display. In some embodiments, device 200 is capable of receiving inputs via one or more of a keyboard, mouse, joystick, touch-sensitive surface (e.g., a touch-pad or touch-sensitive display), button, rotatable input mechanism (e.g., a scroll wheel), speaker (e.g., for voice inputs or commands), or other input mechanism. In the illustrated embodiment, display 202 is a touch-sensitive display.

Device 200 is configured to receive an input (e.g., a contact on touch-sensitive display 202) and produce output data responsive to the input. In some embodiments, the output data represents content (e.g., images and/or video) that is displayable by device 200 on display 202. In some embodiments, the aspect ratio of the content (e.g., GUI screen 204) is based on the aspect ratio of display 202.

Figure 2B:
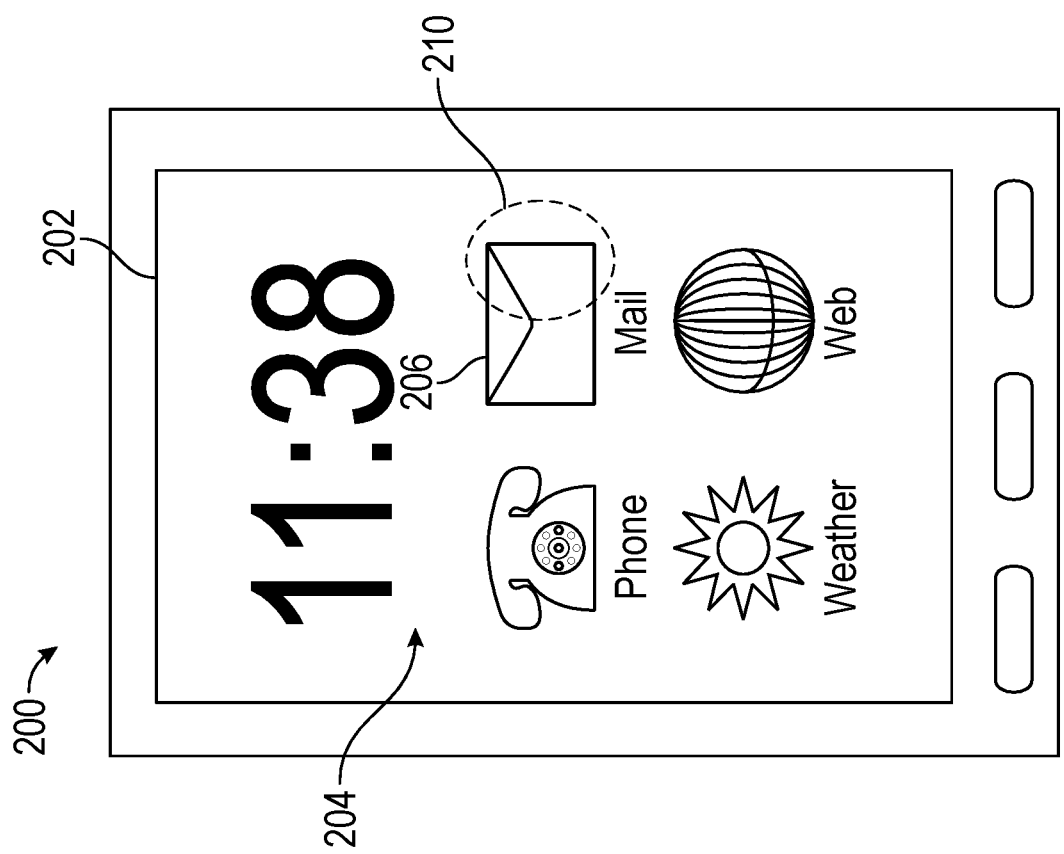

Device 200 is also configured to determine if it is operating in a normal mode or a private mode. FIGS. 2A and 2B illustrate the operation of device 200 in a normal mode. Device 200 receives touch input 210 on icon 206. In response, device 200 launches a corresponding mail application and produces output data representing a GUI screen for the mail application. As device 200 is operating in the normal mode, it displays GUI screen 208 for the mail application on display 202 in accordance with the output data.

FIGS. 3A-3D illustrate device 200 operating in a private mode and an external device 300 (e.g., a tablet), with display 302, that is configured to communicate with device 200. In the illustrated embodiment, external device 300 supports AR functionality (e.g., using video pass-through) and display 302 superimposes virtual objects over images of a physical setting. The depictions on the left side of FIGS. 3A-3D illustrate an unobstructed view of device 200 being held in the hand of a user. The depictions on the right side of FIGS. 3A-3D illustrate the view of device 200 being held in the hand of the user as seen on display 302 of external device 300, meaning that a camera of device 300 is aimed at device 200 while device 200 is operating in private mode.

In private mode, device 200 is configured to not display content on display 202 (or display a reduced set of content that hides sensitive information) while otherwise operating normally. In some embodiments, the private mode is activated in response to a user input (e.g., a user input at device 200) representing a request to enter private mode. In some embodiments, device 200 activates private mode when it determines that device 200 is being viewed using an AR device such as external device 300.

Figure 3A:
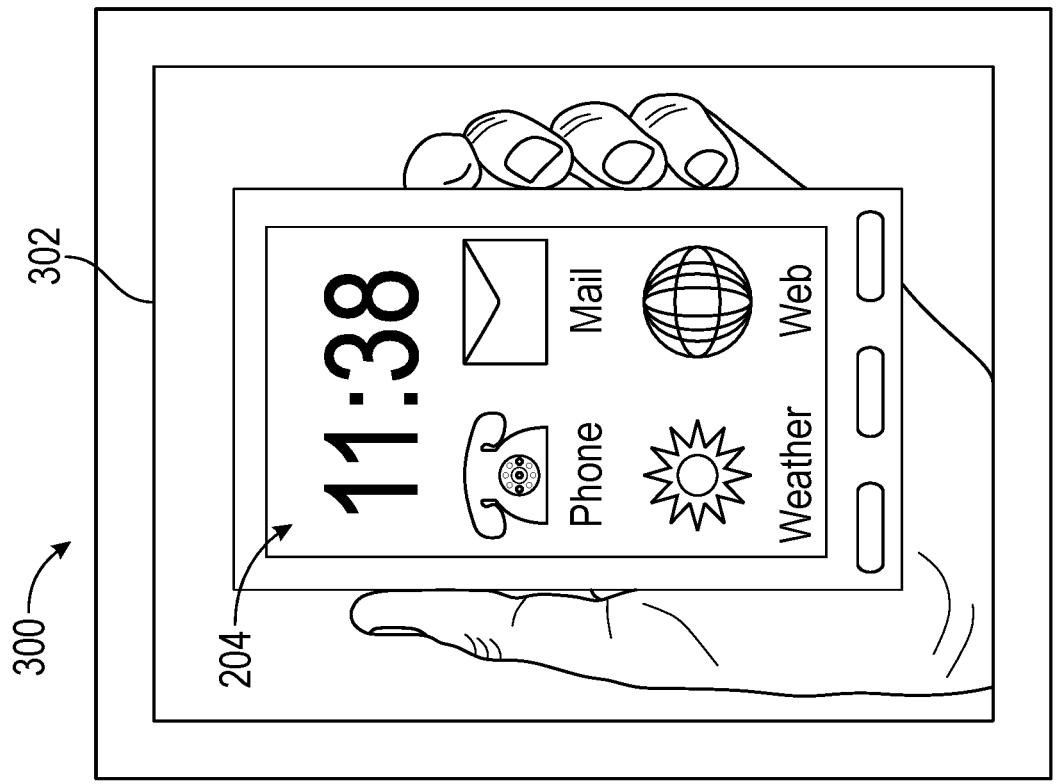
FIGS. 3A-3D illustrate exemplary electronic devices and user interfaces in accordance with some embodiments.
Figure 3A:
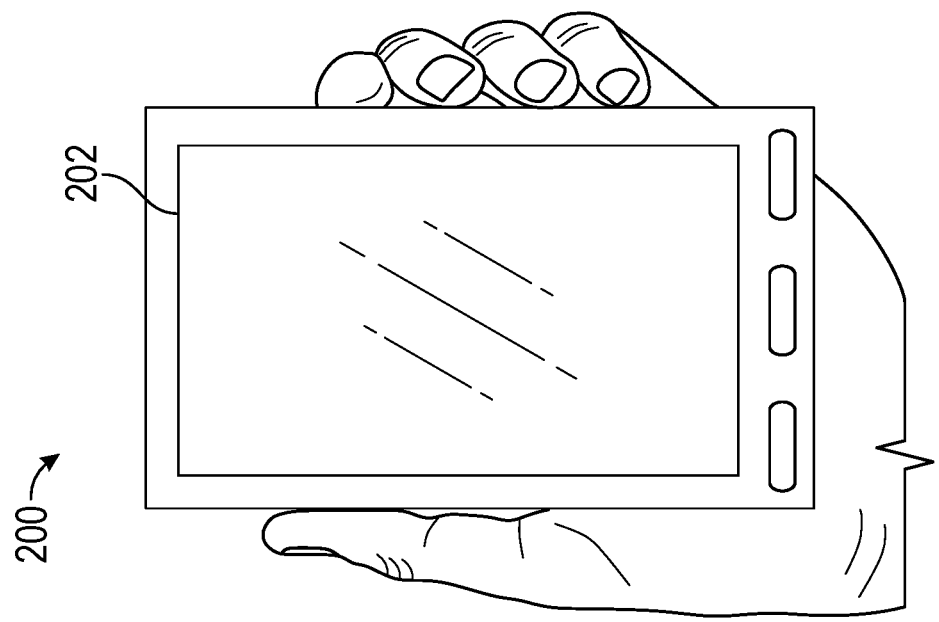
Figure 3B:
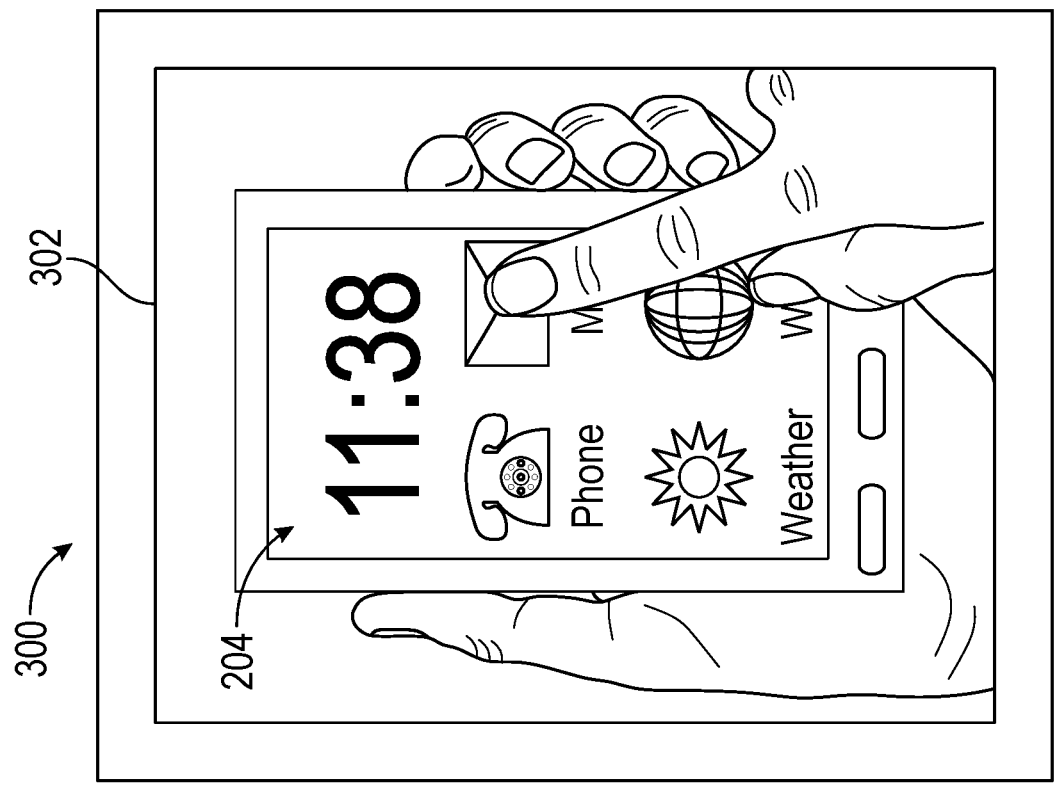
Figure 3B:
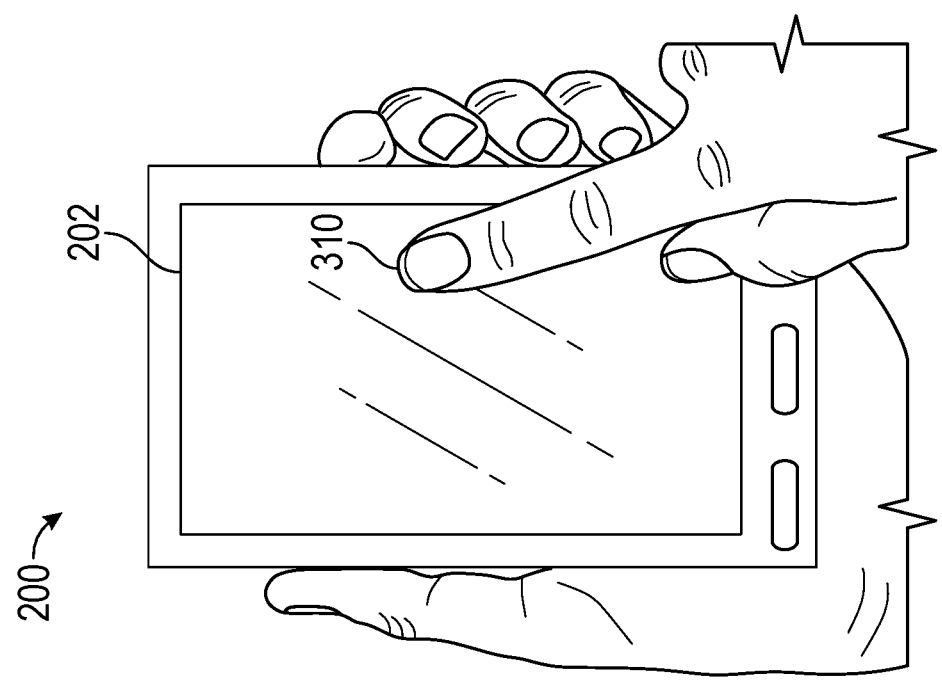

In FIG. 3A, device 200 is operating in the same state illustrated in FIG. 2A, which provides an interface for launching applications, but does not display GUI screen 204 on display 202 because the device is in private mode. Instead, device 200 transmits the output data to external device 300. In some embodiments, device 200 transmits the output data to external device 300 via a wired and/or wireless communication link (e.g., via Bluetooth®, Near-field Communication (NFC), WiFi, or other wireless communication protocol).

External device 300 is configured to display content on display 302 in accordance with the output data transmitted by device 200. As shown in FIG. 3A, external device 300 displays GUI screen 204. In some embodiments, external device 300 sends confirmation to device 200 that a communication link has been established (e.g., in response to establishing a communication link with device 200) and/or that the content is being successfully displayed on display 302 (e.g., in response to successfully receiving output data from device 200 or in response to successfully displaying output data received from device 200). Optionally, if device 200 is operating in a private mode and does not receive confirmation that a communication link has been established or determines that the communication link is poor or has been interrupted, device 200 and/or external device 300 provides an indication that the communication link is poor (e.g., beeps or displays a message, such as "Connection is poor"), while device 200 remains in private mode to maintain the protection of the content on device 200. If the connection is poor, device 200 optionally displays a limited interface to allow a user to exit private mode (e.g., a simple menu to exit private mode that does not include potentially sensitive content).

Figure 3C:
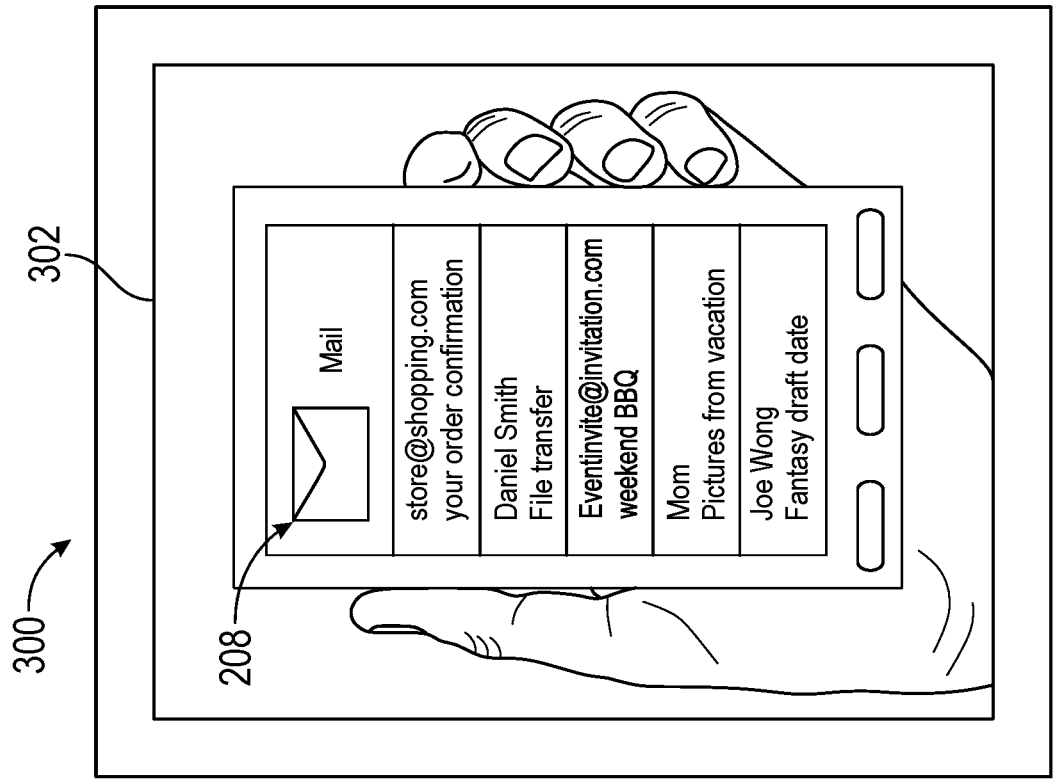
Figure 3C:
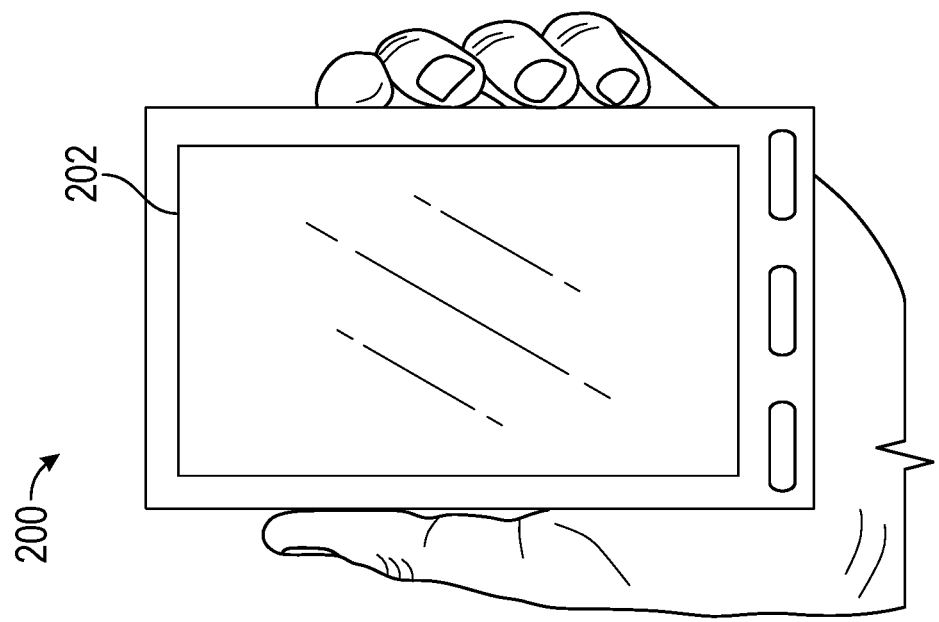

In the embodiment illustrated in FIGS. 3A-3D, although device 200 does not display content, it still provides an interface for performing operations while in private mode. For example, while in private mode, device 200 receives touch input 310 (shown in FIG. 3B) at the same location on display 202 as icon 206 illustrated in FIG. 2A. In response to touch input 210, device 200 launches the mail application and produces output data representing a GUI screen for the mail application. Since device 200 is operating in the private mode, device 200 refrains from displaying content (e.g., GUI screen 208 for the mail application) on display 202 and transmits the output data to external device 300. External device 300 receives the output data produced in response to input 310 and displays the GUI screen 208 on display 302, as shown in FIG. 3C. Thus, the content displayed by external device 300 is in accordance with the operation performed by device 200 (e.g., launching the email application) in response to the input detected by device 200 (e.g., touch input 310). Further, the external device 300 updates the content displayed on display 202 in response to the input at device 200 like device 200 would if device 200 were displaying the content itself on display 202.

Accordingly, in the private mode, device 200 receives inputs and performs operations as it would in a normal operational mode, but does not display the corresponding content. Instead, the content is displayed on a display 302 of external device 300. It is noted that, while operating in private mode, device 200 can refrain from energizing some or all of the light emitting diodes (e.g., turning off the display LEDs) of touchscreen display 202 to preserve battery life while retaining the touch-detection functionality.

It should be recognized that FIGS. 3A-3D illustrate one exemplary embodiment. In some embodiments, external device 300 is a head mounted system (e.g., a head-mounted device) that allows the user to see a physical view of device 200 through (at least partially) transparent displays in combination with virtual object(s) (e.g., GUI screen 108) displayed by the head mounted system. In some embodiments, external device 300 is a projection-based or other SR system that carries out a computer simulated reality technique that includes some or all of the features described above. In some embodiments, external device 300 is connected by a wire or wirelessly (e.g., via Bluetooth® protocol) to display 302 (or another device that includes display 302). In some examples, external device 300 is a computing device (e.g., an smartphone) in communication with a head mounted system that includes display 302. This may allow the techniques described herein to be implemented with a display (e.g., a headset) that is configured to communicate directly with external device 300 but not with device 200.

Figure 4:
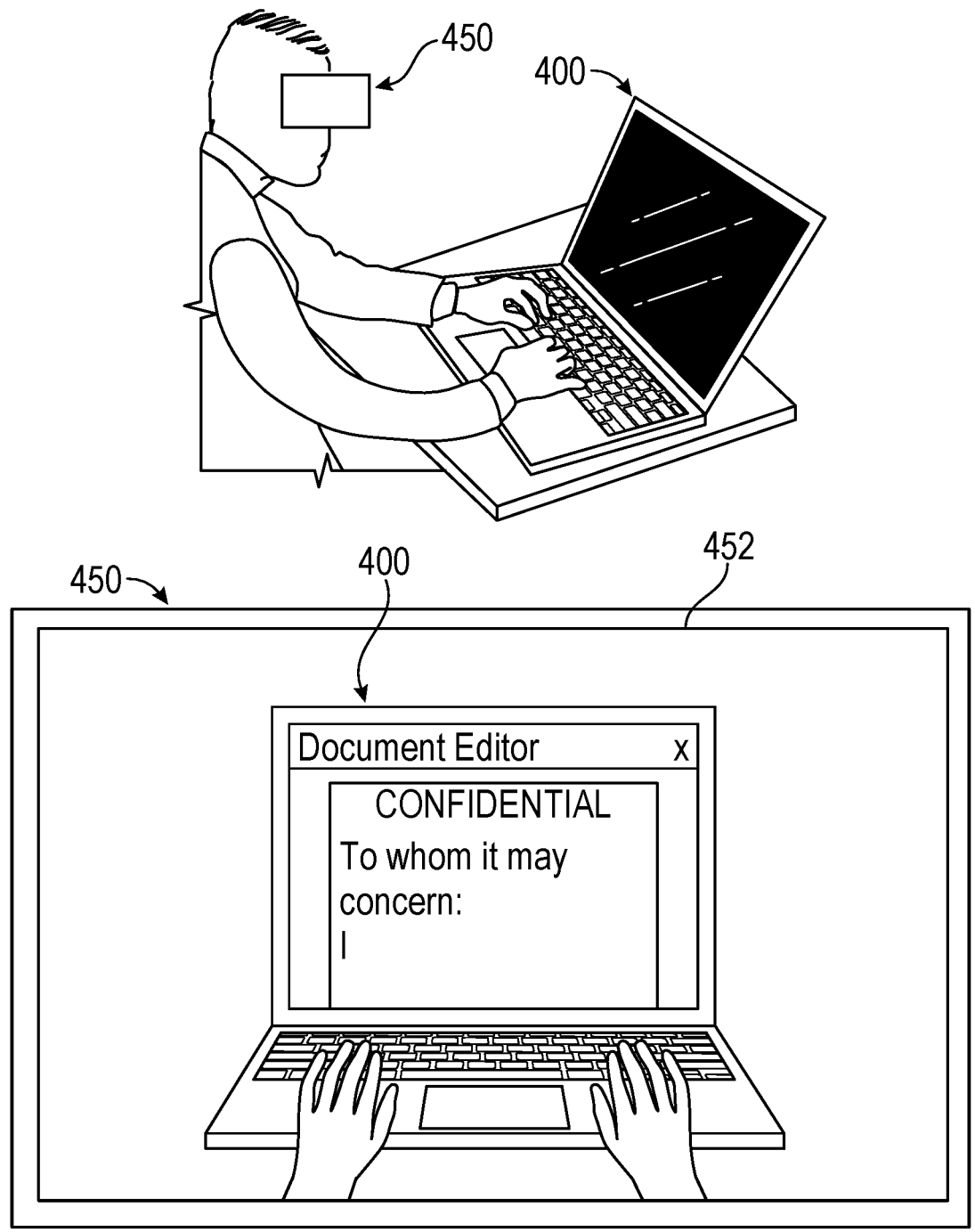
FIG. 4 illustrates exemplary electronic devices and user interfaces in accordance with some embodiments.

When display 302 of external device 300 can only be viewed by the user (such as in the case of a personal headset worn by the user), this feature provides privacy by allowing the user to operate device 200 while preventing other people from viewing the content (e.g., e-mails, documents, applications, etc.) being processed by device 200, which would typically be provided on display 202. For example, FIG. 4 illustrates device 400 (e.g., a laptop computer) operating in private mode with head mounted system 450. As shown in FIG. 4, device 400 can be seen through the display 452 of head mounted system 450 and is being used to edit a confidential document that is only presented on display 452. Since the content of the document is only displayed on display 452 of head mounted system 450, device 400 can be used privately to edit the document, such as by device 400 receiving user inputs on a keyboard and/or touchpad of device 400.

Returning again to the devices depicted in FIGS. 3A-3D, in some embodiments, when specifically instructed by a user, device 200 transmits the output data to more than one external device (e.g., to external device 300 and to another external device). For example, device 200 transmits the output data to an external device operated by the user of device 200 and to an external device of other users so that the authorized peers of the user of device 200 can view a presentation concurrently. In this way, a user can share the content of device 200 with those authorized by the user while maintaining the privacy of display 202 from those who are not authorized. In some embodiments, upon specific user instruction, device 200 receives a first configuration request to enable viewing of content on multiple devices. In response to receiving the first configuration request, device 200 transmits output data to a first external device and a second external device. Subsequently, device 200 receives a second configured request to disable viewing of content on multiple devices. In response to receiving the second configuration request, device 200 continues to transmit output data to the first external device and ceases transmitting output data to the second external device.

In some embodiments, external device 300 determines the position (e.g., location and/or orientation) of display 202 and displays the content based on the determined position of display 202. The position can be an absolute position or a relative position (e.g., relative to the position of display 302). In some embodiments, external device 300 determines the position of display 202 based at least in part on position data received from device 200. For example, device 200 may include sensors (e.g., accelerometers, gyroscopes, etc.) that determine a position of display 202, which is then sent to external device 300. In some embodiments, external device 300 includes one or more sensors (e.g., an exterior camera) that determine a position of display 202 (e.g., using image processing and/or feature recognition processing). External device 300 may also include sensors to determine the position and/or motion of the external device 300 itself, which is then used to determine the position of display 202 relative to display 302.

In some embodiments, the position of display 202 is used to determine the position of the content on display 302. That is, the position of the content on display 302 is based on the position of display 202 (e.g., the absolute position of display 202 or the position of display 202 relative to display 302). For example, in the embodiment illustrated in FIGS. 3A-3D, the position of GUI screens 204 and 208 correspond to the position of display 202 such that GUI screens 204 and 108 are superimposed on display 202 of device 200. In other words, GUI screens 204 and 208 appear to the user as though they are displayed on device 200, even though they are actually displayed on display 302 of external device 300. Thus, when viewed using external device 300, device 200 appears as it would in normal mode. This allows the user to easily operate device 200. For example, since the icons are not actually displayed on display 202, using display 302 to superimpose the GUI screen 204 on display 202 assists the user in touching the correct area of the display for performing the desired operation.

Figure 3D:
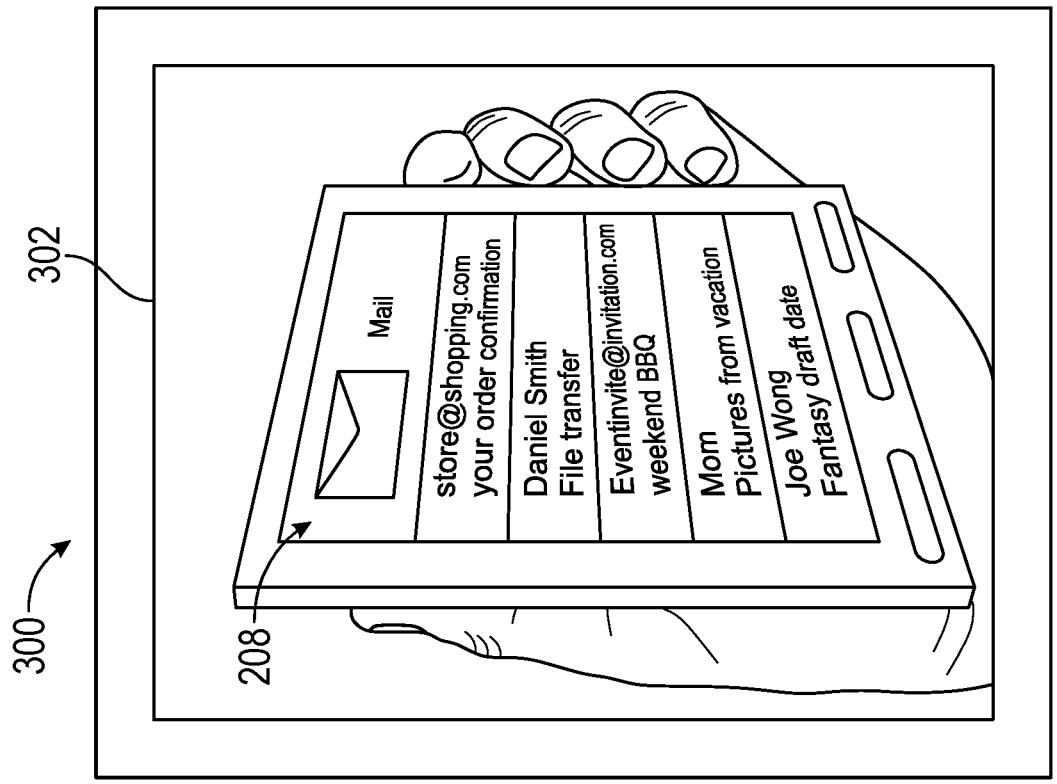
Figure 3D:
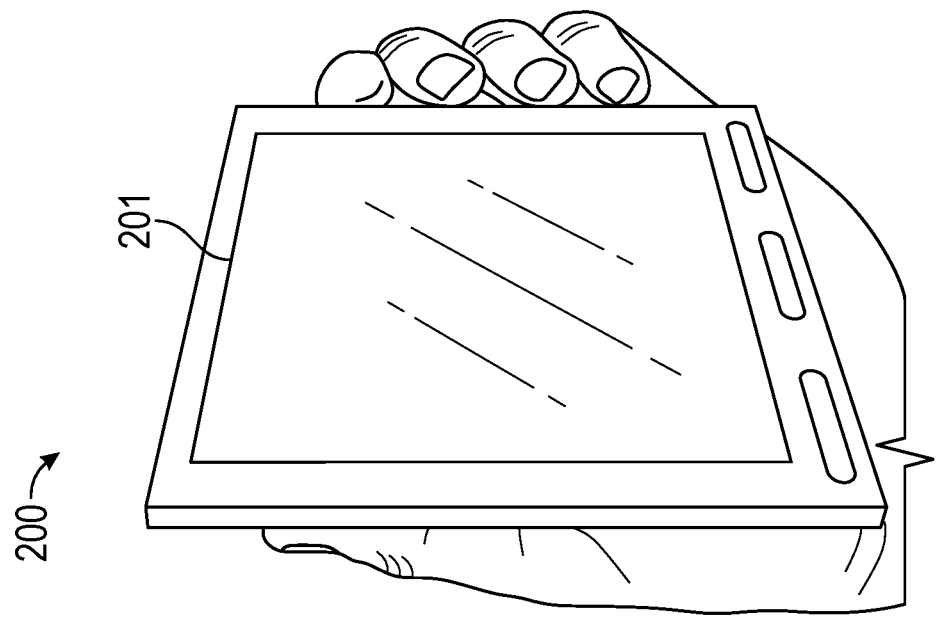

In some embodiments, device 200 further determines an updated position of display 202 and then changes the position of the content on display 302 based on the updated position. In some examples, device 200 tracks the position of display 202 and updates the displayed position of the content so that the content appears to be maintained on display 202 as display 202 moves. In some embodiments, in order to maintain the appearance that the content is displayed on display 202, external device 300 transforms the output data from device 200 (e.g., translates, rotates, enlarges, shrinks, stretches, compresses, or otherwise manipulates the image to be displayed) such that the content appears as though it is displayed on display 202. For example, as shown in FIG. 3D, display 202 is rotated compared to the position shown in FIGS. 3A-3C. To compensate for the change in position, external device 300 compresses the image of GUI screen 208 and applies a perspective effect so that the image appears to be mapped onto display 202, as seen from the point of view of the user.

Figure 5:
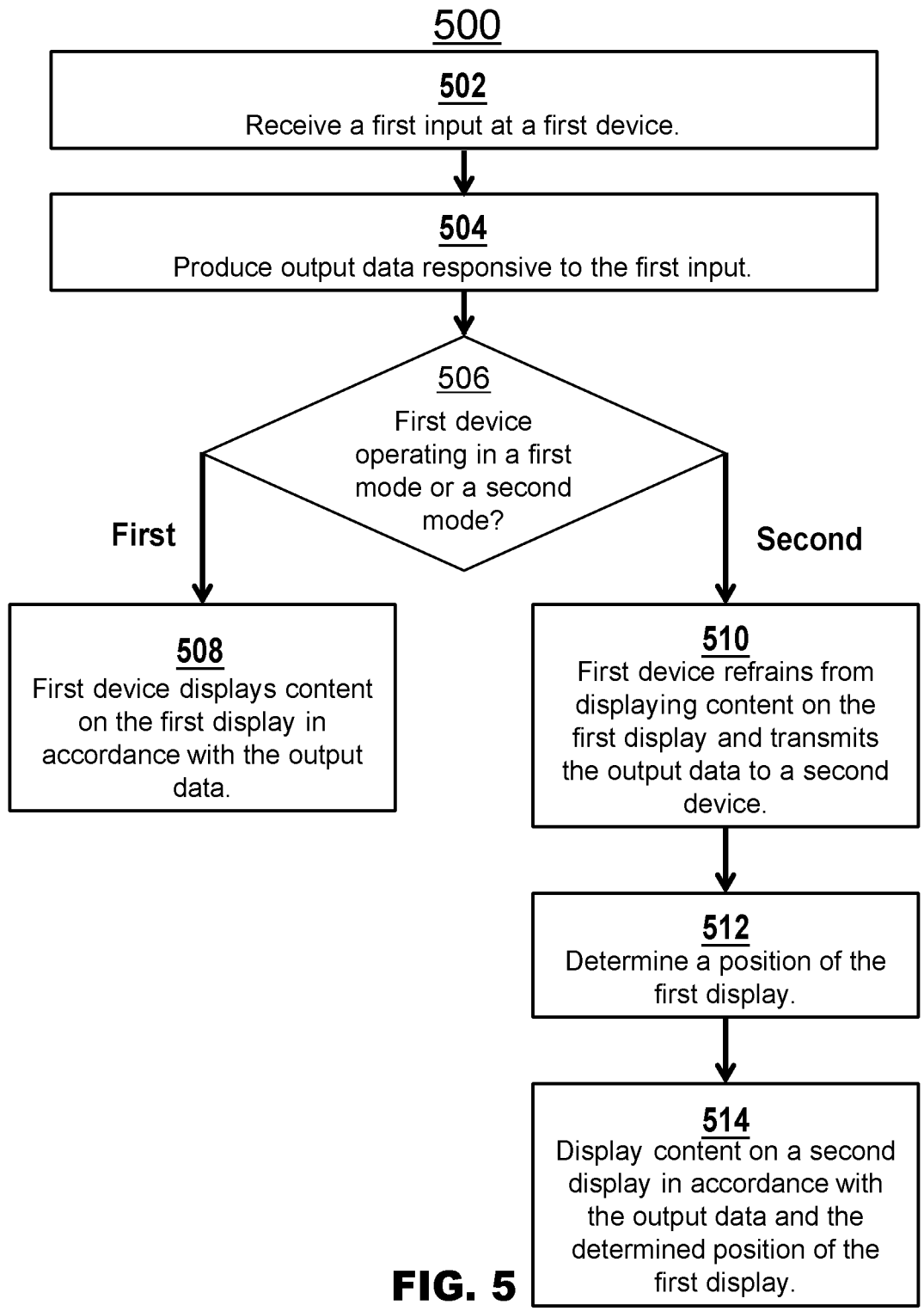
FIG. 5 is a flow diagram illustrating a method for providing a privacy screen on an electronic device.

FIG. 5 is a flow diagram illustrating a method for providing a privacy screen on an electronic device in accordance with some embodiments. Method 500 is performed at system that includes a first device (e.g., device 200) with a first display (e.g., display 202) and a second device (e.g., device 300) with a second display (e.g., display 302) different than the first display. In some embodiments, the first device is a laptop, tablet, smartphone, or smartwatch. In some embodiments, the second device is a head-mounted device. Some operations in method 500 are, optionally, combined, the orders of some operations are, optionally, changed, and some operations are, optionally, omitted.

At block 502, the first device receives a first input (e.g., input 301). In some embodiments, the first display is a touch-screen display and the first input is a contact on the touch-screen. At block 504, the first device produces output data responsive to the first input. In some embodiments, the output data includes visual output (e.g., video data).

At block 506, the first device determines if the first device is operating in a first (e.g., normal) mode or a second (e.g., private) mode. At block 508, if the first device is operating in the first mode, the first device displays content on the first display in accordance with the output data. Optionally, if the first device is operating in the first mode, the first device refrains from transmitting the output data to the second device. At block 510, if the first device is operating in the second mode, the first device refrains from displaying content on the first display in accordance with the output data, and transmits the output data to the second device. Optionally, refraining from displaying content on the first display in accordance with the output data includes not displaying any content on the first display, not presenting visible content on the first display, or turning off display elements (e.g., LEDs) of the first display. Optionally, if the first device is operating in the second mode, the first device transmits the output data to a third device different from the first device and the second device.

At block 512, the second device determines (e.g., using an image sensor) a position of the first display (e.g., relative to the second display). In some embodiments, determining the position of the first display includes obtaining an image of the first device with an image sensor of the second device and determining, using the obtained image, the position of the first display (e.g., relative to the second display). At block 414, the second device displays, on the second display, content in accordance with the output data and the determined position of the first display. Optionally, the position of the content on the second display is based on the position of the second display. Optionally, the position of the content on the second display is based on the position of the second device with respect to the first device. Optionally, the position of the content on the second display corresponds to the position of the first display. In some embodiments, an image of the first device is obtained using an image sensor of the second device, and displaying the content includes displaying (e.g., on the second display) a representation of at least a portion of the first device using the obtained image. Optionally, the second device determines a second position of the first display (e.g., relative to the second display), and changes the position of the content on the second display based on the determined second position of the first display.

Figure 6:
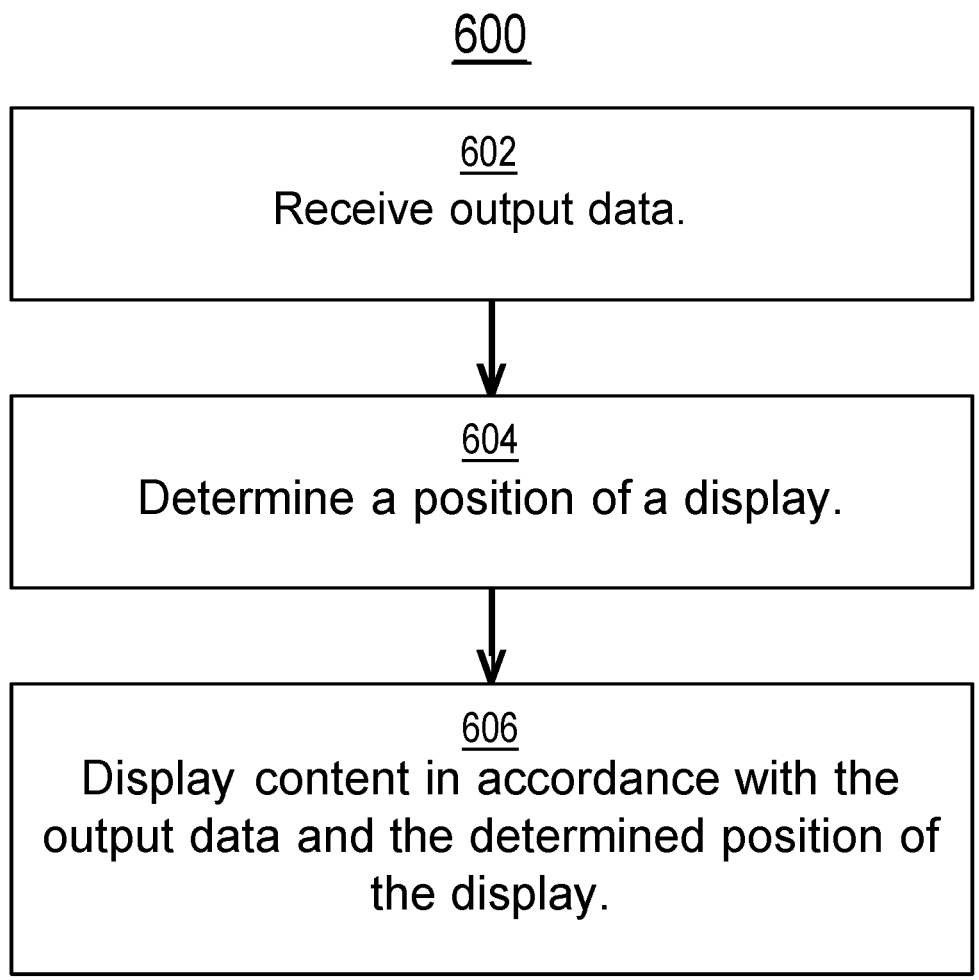
FIG. 6 is a flow diagram illustrating a method for providing a privacy screen on an electronic device.

FIG. 6 is a flow diagram illustrating a method for providing a privacy screen on an electronic device in accordance with some embodiments. Method 600 is performed at a first device (e.g., device 300) coupled with a first display (e.g., display 302) and, optionally, an image sensor. In some embodiments, the first device is a head mounted system that supports simulated reality features. Some operations in method 600 are, optionally, combined, and the orders of some operations are, optionally, changed. Some operations in method 600 are, optionally, included in method 500, and some operations in method 500 are, optionally, included in method 600.

At block 602, the first device receives output data from a second device (e.g., device 200) having a second display (e.g., display 202) different from the first display. In some embodiments, the second device is a laptop, tablet, smartphone, or smartwatch. In some embodiments, the output is generated by the second device responsive to contact on a touch-screen display of the second device. Optionally, the output data represents content displayable by the second device on the second display. Optionally, the content includes visual output (e.g., video data).

At block 604, the first device determines (e.g., using an image sensor) a position of the second display (e.g., relative to the first device). At block 506, the first device causes the first display to display content based on the output data received from the second device and the determined position of the second display. In some embodiments, an image of the second device is obtained (e.g., using an image sensor of the first device), and causing the first display to display content includes causing display of a representation of at least a portion of the second device using the obtained image. Optionally, the position of the content (e.g., display location of the content on the first display) is based on the position of the second display. Optionally, the position of the content (e.g., display location of the content on the first display) corresponds to the position of the second display. Optionally, the first device determines a second position of the second display (e.g., relative to the first display) and changes the position of the content based on the determined second position of the second display. Optionally, the first device updates the content displayed at the first display responsive to an input (e.g., input 310) at the second device. Optionally, the updated content is in accordance with an operation performed by the second device in response to the input detected by the second device.

In some embodiments, the content is not displayed by the second device on the second display while the first display is displaying the content. Optionally, the first device sends instructions to the second device to refrain from displaying the content on the second display or from presenting visible content on the second display. Optionally, the instructions include instructions to turn off elements of the second display. In some embodiments, the first device sends confirmation to the second device that a communication link between the first device and the second device has been established. Optionally, the first device provides an indication in response to the communication link being interrupted. In some embodiments, the first device causes the content to be displayed on a third display different from the first display and the second display.

Executable instructions for performing the features of methods 500 and/or 600 described above are, optionally, included in a transitory or non-transitory computer-readable storage medium (e.g., memory(ies) 106) or other computer program product configured for execution by one or more processors (e.g., processor(s) 102).

Aspects of the techniques described above contemplate the possibility of gathering and using personal information to provide an improved privacy screen on an electronic device. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A system comprising:
a first device with a first display and a second device with a second display different than the first display,
the first device configured to:
produce output data responsive to input;
determine that the first device is operating in a first mode;
while the first device is operating in the first mode, display content on the first display in accordance with the output data;
determine that the first device is being viewed with the second device;
in response to determining that the first device is being viewed with the second device, activate a second mode of the first device; and
while the first device is operating in the second mode, refrain from displaying content on the first display in accordance with the output data, and transmit the output data to the second device, and
the second device configured to:
while the first device is operating in the second mode, display, on the second display, content in accordance with the output data and a determined position of the first display relative to the second display, wherein the position of the first display relative to the second display is determined using an image sensor of the second device.

2. The system of claim 1, wherein the second device is further configured to obtain, using the image sensor of the second device, an image of the first device, and wherein the position of the first display relative to the second display is determined using the obtained image.

3. The system of claim 1, wherein the second device is further configured to:
determine a second position of the first display relative to the second display; and
change the position of the content based on the determined second position of the first display.

4. The system of claim 1, wherein refraining from displaying content on the first display in accordance with the output data includes not presenting visible content on the first display.

5. The system of claim 1, wherein refraining from displaying content on the first display in accordance with the output data includes turning off display elements of the first display.

6. The system of claim 1, wherein the first display is a touch-screen display and the input is a contact on the touch-screen display.

7. The system of claim 1, wherein the second device is a head-mounted device.

8. The system of claim 1, wherein the output data includes visual output.

9. A non-transitory computer-readable storage medium comprising one or more programs for execution by one or more processors of a system having a first electronic device with a first display and a second electronic device with a second display, the one or more programs including instructions which, when executed by the one or more processors, cause the system to:
- produce output data responsive to input;
- determine that the first device is operating in a first mode;
- while the first device is operating in the first mode, display content on the first display in accordance with the output data;
- determine that the first device is being viewed with the second device;
- in response to determining that the first device is being viewed with the second device, activate a second mode of the first device;
- while the first device is operating in the second mode, refrain from displaying content on the first display in accordance with the output data, and transmit the output data to the second device; and
- while the first device is operating in the second mode, display, on the second display, content in accordance with the output data and the determined position of the first display relative to the second display.

10. A method of operating a system that includes a first device with a first display and a second device with a second display different than the first display, the method comprising:
- producing output data, by the first device, responsive to input;
- determining that the first device is operating in a first mode;
- while the first device is operating in the first mode, displaying content on the first display in accordance with the output data;
- determining that the first device is being viewed with the second device;
- in response to determining that the first device is being viewed with the second device, activating a second mode of the first device;
- while the first device is operating in the second mode, refraining from displaying content on the first display in accordance with the output data, and transmitting the output data to the second device; and
- while the first device is operating in the second mode, displaying, on the second display, content in accordance with the output data and the determined position of the first display relative to the second display.

11. A first electronic device comprising:
- a first display;
- one or more processors; and
- memory storing one or more programs configured to be executed by the one or more processors, the one or more programs including instructions for:
  - producing output data responsive to input;
  - determining that the first electronic device is operating in a first mode;
  - while the first electronic device is operating in the first mode, displaying content on the first display in accordance with the output data;
  - determining that the first electronic device is being viewed with a second electronic device having a second display different from the first display;
  - in response to determining that the first electronic device is being viewed with the second electronic device, activating a second mode of the first electronic device;
  - while the first electronic device is operating in the second mode:
    - refraining from displaying content on the first display in accordance with the output data; and
    - transmitting the output data from the first electronic device to the second electronic device, wherein the output data represents content displayable by the second electronic device on the second display.

12. The electronic device of claim 11, the one or more programs further including instructions for:
- updating the content responsive to an input at the first electronic device.

13. The electronic device of claim 11, wherein the second electronic device is a head-mounted device.

14. The electronic device of claim 11, wherein the first electronic device comprises a touch-screen display and wherein the output data is generated by the first electronic device responsive to contact on the touch-screen display.

15. A non-transitory computer-readable storage medium comprising one or more programs for execution by one or more processors of a first electronic device coupled with a first display, the one or more programs including instructions which, when executed by the one or more processors, cause the first electronic device to:
- produce output data responsive to input
- determine that the first electronic device is operating in a first mode;
- while the first electronic device is operating in the first mode, display content on the first display in accordance with the output data;
- determine that the first electronic device is being viewed with a second electronic device having a second display different from the first display;
- in response to determining that the first electronic device is being viewed with the second electronic device, activate a second mode of the first electronic device;
- while the first electronic device is operating in the second mode:
  - refrain from displaying content on the first display in accordance with the output data; and
  - transmit the output data from the first electronic device to the second electronic device, wherein the output data represents content displayable by the second electronic device on the second display.

16. A method comprising:
at a first device coupled with a first display:
- producing output data responsive to input
- determining that the first device is operating in a first mode;
- while the first device is operating in the first mode, displaying content on the first display in accordance with the output data;
- determining that the first device is being viewed with a second device having a second display different from the first display;
- in response to determining that the first device is being viewed with the second device, activating a second mode of the first device;
- while the first device is operating in the second mode:
  - refraining from displaying content on the first display in accordance with the output data; and
  - transmitting the output data from the first device to the second device, wherein the output data represents content displayable by the second device on the second display.

* * * * *